(12) United States Patent
Kiyohara

(10) Patent No.: US 11,180,178 B2
(45) Date of Patent: Nov. 23, 2021

(54) STEERING WHEEL

(71) Applicant: ASHIMORI INDUSTRY CO., LTD., Settsu (JP)

(72) Inventor: Junichi Kiyohara, Osaka (JP)

(73) Assignee: ASHIMORI INDUSTRY CO., LTD., Settsu (JP)

(*) Notice: Subject to any disclaimer, the term of this patent is extended or adjusted under 35 U.S.C. 154(b) by 0 days.

(21) Appl. No.: 16/979,779

(22) PCT Filed: Mar. 6, 2019

(86) PCT No.: PCT/JP2019/008914
§ 371 (c)(1),
(2) Date: Sep. 10, 2020

(87) PCT Pub. No.: WO2019/181514
PCT Pub. Date: Sep. 26, 2019

(65) Prior Publication Data
US 2021/0039704 A1    Feb. 11, 2021

(30) Foreign Application Priority Data

Mar. 19, 2018  (JP) .............................. JP2018-051059

(51) Int. Cl.
*B62D 1/11* (2006.01)
*B60R 21/203* (2006.01)

(52) U.S. Cl.
CPC .............. *B62D 1/11* (2013.01); *B60R 21/203* (2013.01)

(58) Field of Classification Search
CPC ......... B62D 7/222; B62D 1/11; B60R 21/203; B60R 21/2037
See application file for complete search history.

(56) References Cited

U.S. PATENT DOCUMENTS 5,931,492 A      8/1999  Mueller et al.
7,464,959 B2 *  12/2008  Pillsbury, IV ......... B60Q 5/003
                                                200/61.55
(Continued)

FOREIGN PATENT DOCUMENTS

DE   10-2016-108186 A1    11/2017
ER        1400414 B1      3/2004
(Continued)

OTHER PUBLICATIONS

Written Opinion (PCT/ISA/237) issued by the International Searching Authority in corresponding International Application No. PCT/JP2019/008914, dated May 28, 2019.
(Continued)

*Primary Examiner* — Laura Freedman
(74) *Attorney, Agent, or Firm* — Sughrue Mion, PLLC

(57) ABSTRACT

Provided is a steering wheel including a dynamic damper mechanism which does not easily deteriorate over time, in which a resonance frequency to be damped does not easily change. An attaching structure for attaching an airbag device to a steering wheel incudes: a tubular guide member (51) passing through an opening of a fixing plate (25) of the airbag device; a hook (70, 80) engaging with a lock spring (53); a hollow holding member (67) fixed to a main body part (110) of the steering wheel and holding a base end portion (71) of the hook while restricting the base end portion (71) from moving toward a tip end portion (75) of the hook; and a return spring (61), and the base end portion (71) has a bottom portion being a convex spherical shape.

3 Claims, 11 Drawing Sheets

(56) References Cited

U.S. PATENT DOCUMENTS

| | | | | |
|---|---|---|---|---|
| 7,533,897 B1 * | 5/2009 | Xu | ................ | B60Q 5/003 |
| | | | | 280/728.2 |
| 2014/0131982 A1 | 5/2014 | Ishii et al. | | |
| 2014/0306432 A1 | 10/2014 | Obayashi et al. | | |
| 2017/0036687 A1 | 2/2017 | Obayashi et al. | | |
| 2017/0072985 A1 | 3/2017 | Ishii et al. | | |

FOREIGN PATENT DOCUMENTS

| | | |
|---|---|---|
| JP | H05-016549 U | 3/1993 |
| JP | 2013-082283 A | 5/2013 |
| JP | 2014-111426 A | 6/2014 |
| JP | 2015-096375 A | 5/2015 |
| JP | 2015-145173 A | 8/2015 |
| JP | 2017-052433 A | 3/2017 |
| JP | 2017-218034 A | 12/2017 |
| WO | 2013077215 A1 | 5/2013 |
| WO | 2015098224 A1 | 7/2015 |

OTHER PUBLICATIONS

International Search Report (PCT/ISA/210), issued by International Searching Authority in corresponding International Application No. PCT/JP2019/008914, dated May 28, 2019.

* cited by examiner

[FIG.1]
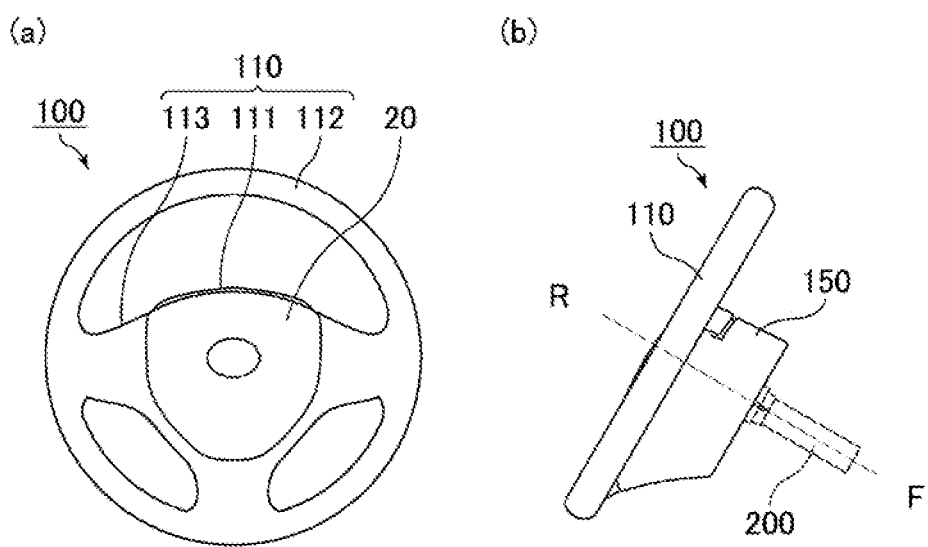

[FIG.2]
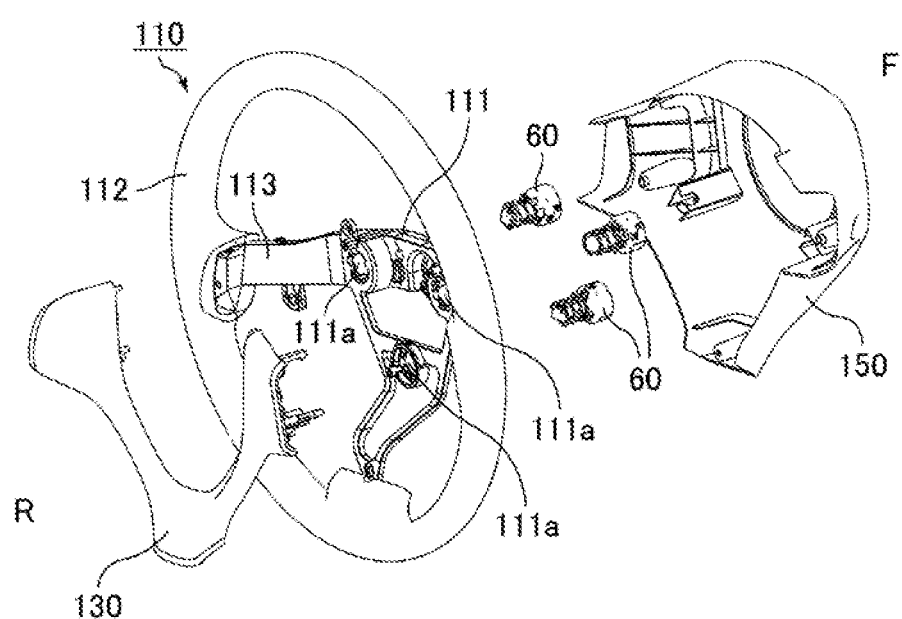

[FIG.3]
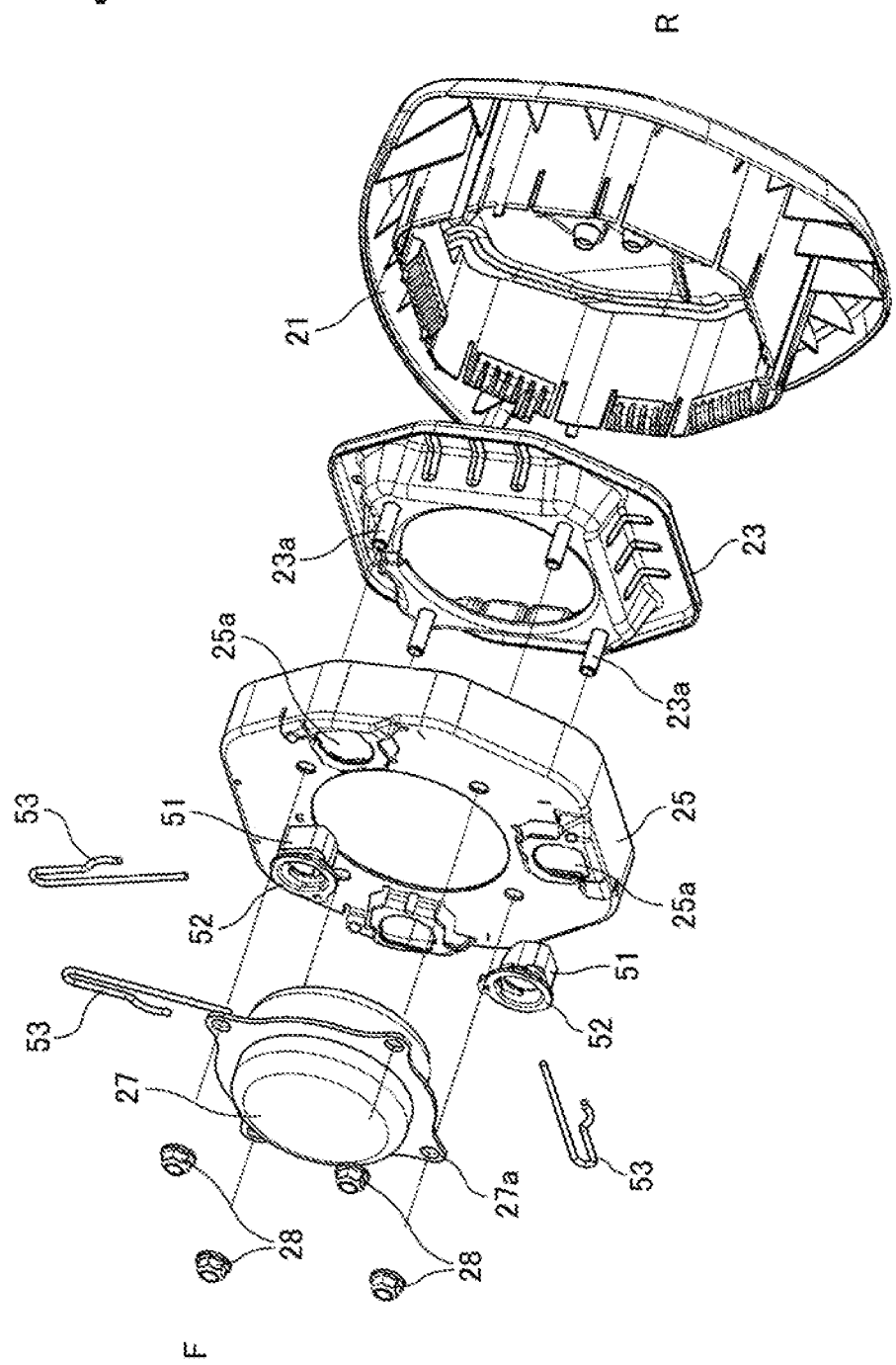

[FIG.4]
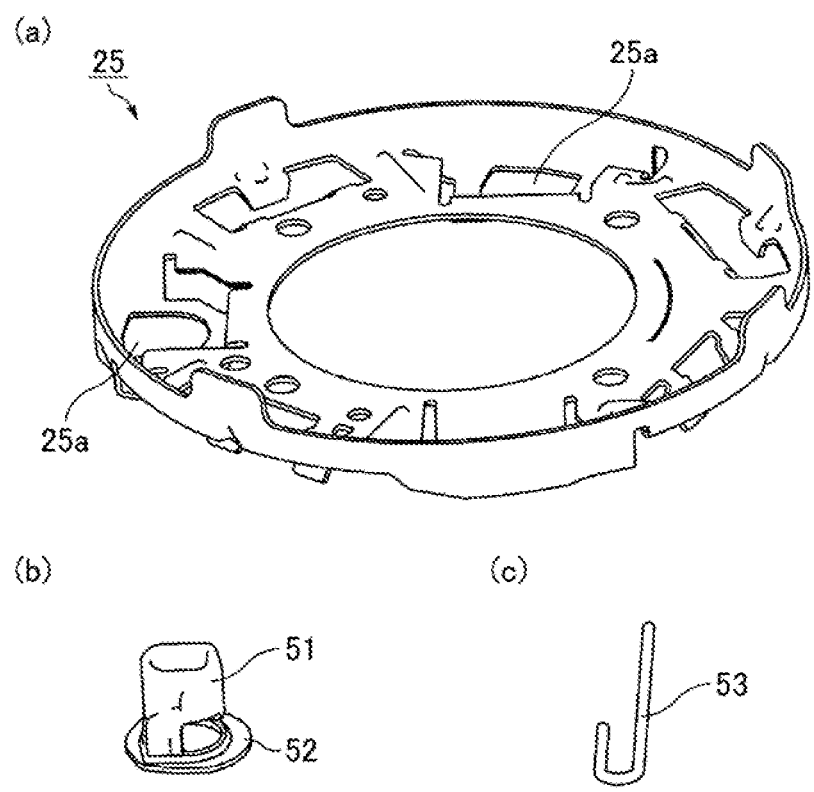

[FIG.5]
(a)
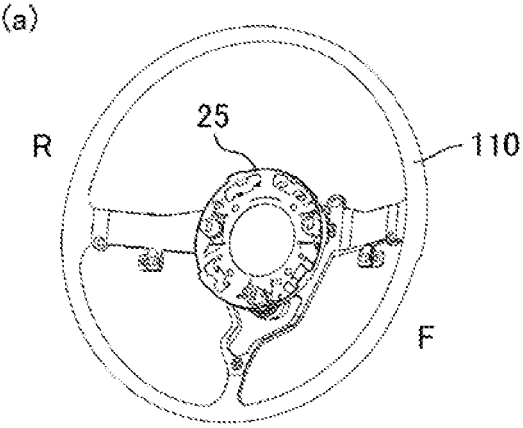
(b)
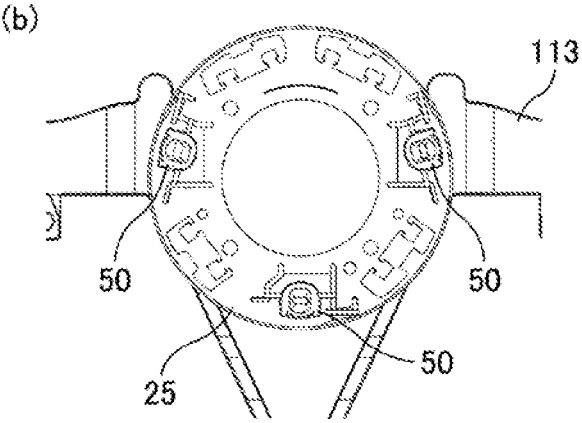
(c)
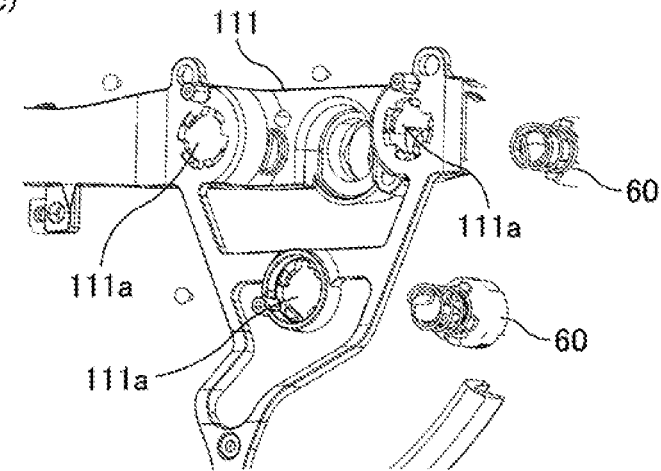

[FIG.6]
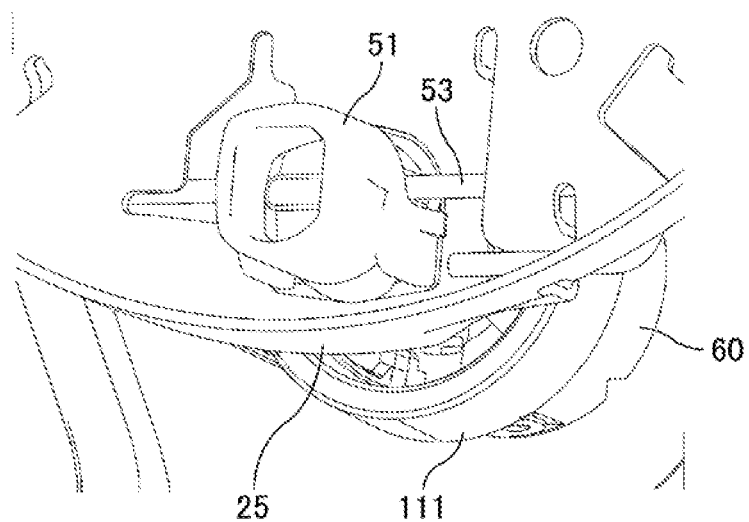

[FIG.7]
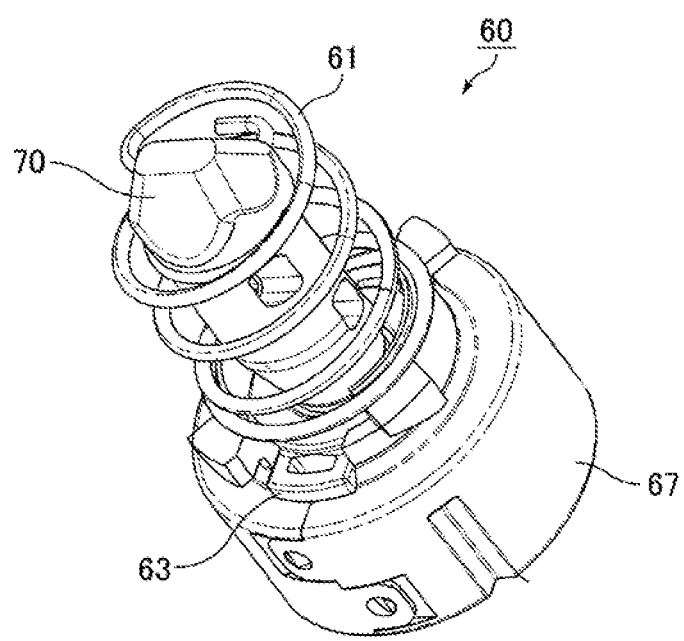

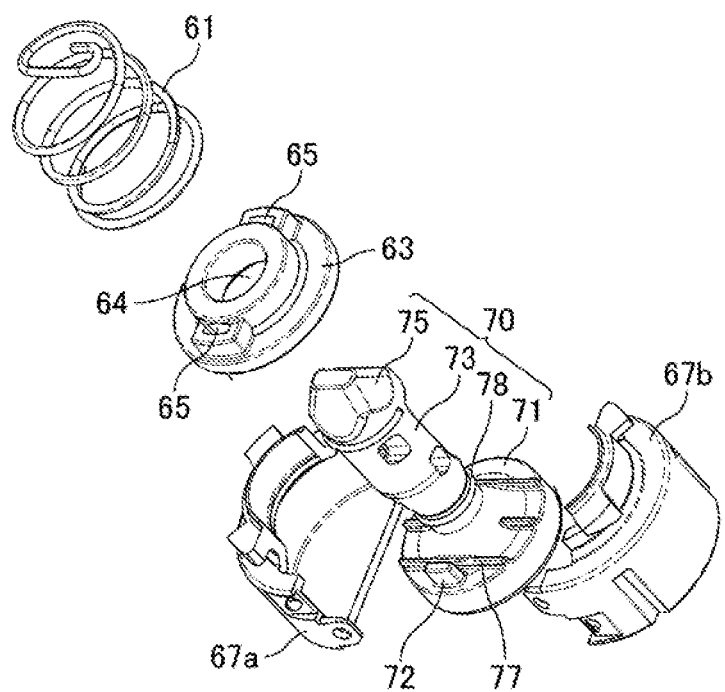
[FIG.8]

[FIG.9]
(a)
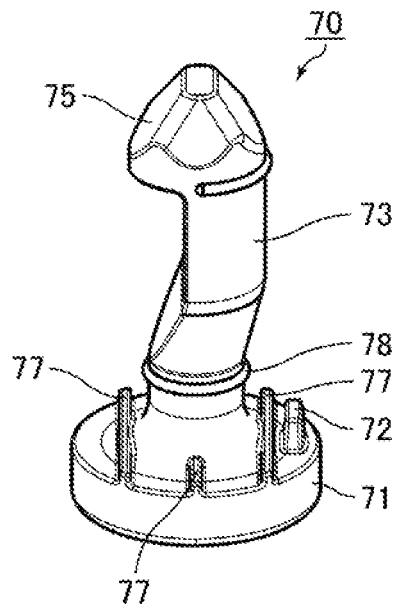
(b)
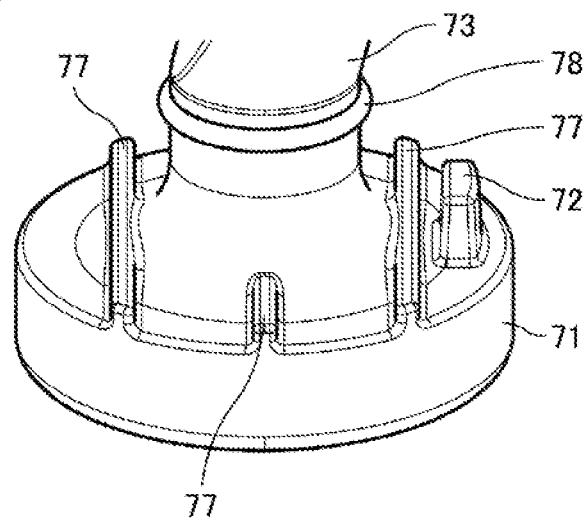

[FIG.10]
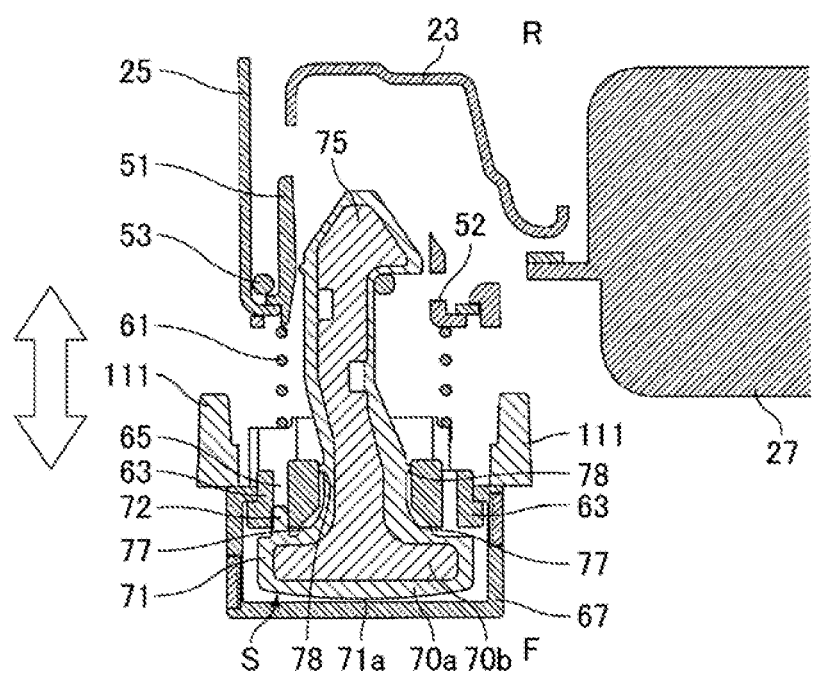

[FIG.11]
(a)
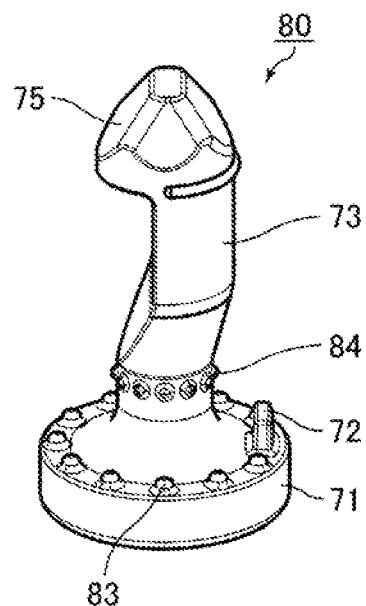
(b)
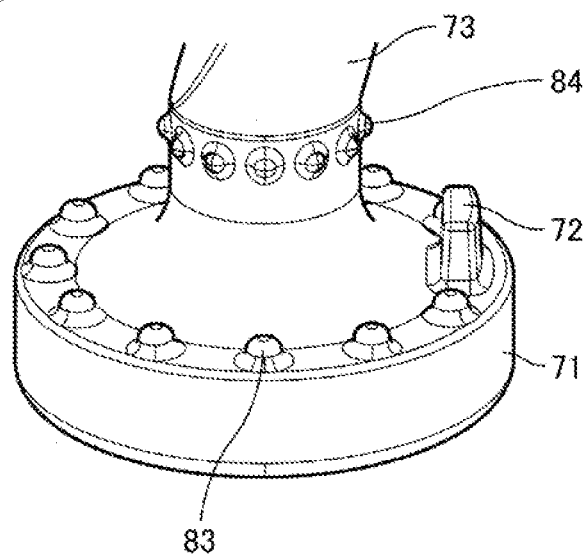

STEERING WHEEL

TECHNICAL FIELD

The present invention relates to a steering wheel. More specifically, the present invention relates to a steering wheel that uses an airbag device as a dynamic damper.

BACKGROUND ART

In order to suppress a vibration transmitted from a steering shaft to a steering wheel, there is known a technology in which the airbag device is used as a dynamic damper by interposing an elastic member such as rubber between the steering wheel and an airbag device attached to the steering wheel. According to the technology, when a vibration having a frequency equal to or close to a resonance frequency inherent to the dynamic damper is transmitted from the steering wheel to the airbag device, the airbag device resonates to cancel a part of the vibration of the steering wheel. By this cancellation, the vibration of the steering wheel is suppressed (damped).

In a steering wheel described in Patent Literature 1, an elastic member 41 and a damper holder 42 are interposed between an attaching member (snap pin 31) and a cap (contact holder 33) fixed to a holding member (horn plate) of an airbag device. Also, a slider (pin holder 32) is provided between the elastic member 41 and the attaching member such that, when the airbag device is pushed down to sound a horn, the elastic member 41 easily slides along the attaching member. Further, the elastic member 41 having a gap in a part of the elastic member 41 is crushed and sandwiched between the slider and the damper holder 42 such that a position of the elastic member 41 is not shifted.

CITATION LIST

Patent Literature

Patent Literature 1: JP-A-2014-111426

SUMMARY OF INVENTION

Technical Problem

In a structure described in Patent Literature 1, when the vibration transmitted to the steering wheel is damped, the airbag device swings around the elastic member, so that a load is applied to the elastic member serving as a fulcrum of the swing. When the elastic member deteriorates due to the load, an amplitude of the airbag device changes from that before the deterioration, and therefore a damped resonance frequency may change, and a vibration damping performance of the dynamic damper may deteriorate.

The present invention has been made in view of the above circumstances, and an object thereof is to provide a steering wheel including a dynamic damper mechanism in which deterioration over time is difficult to occur and a damped resonance frequency is difficult to change.

Solution to Problem

In order to solve the problem and achieve the object described above, according to one aspect of the present invention, there is provided a steering wheel including:
a main body part to which a fixing plate of an airbag device is attached by a plurality of attaching structures, in which each attaching structure includes:
a tubular guide member passing through an opening of the fixing plate, the guide member including a flange portion facing the main body part;
a lock spring fixed at a position crossing the opening;
a hook passing through the opening, the hook having: a tip end portion locked to the lock spring at a position where the tip end portion is beyond the lock spring; and a base end portion provided at an end portion opposite the tip end portion;
a hollow holding member fixed to the main body part and disposed to face the guide member, the holding member holding the base end portion of the hook, while restricting the base end portion from moving toward a side of the tip end portion; and
a return spring disposed to surround the hook, one end of the return spring abutting against the main body part of the steering wheel or the holding member, the other end of the return spring abutting against the flange portion of the guide member, the return spring urging the main body part or the holding member and the flange portion in a separating direction, and
the base end portion has a bottom portion being a convex spherical shape.

Advantageous Effects of Invention

Since the steering wheel of the present invention swings the airbag device, which is a dynamic damper, using the swing of the hook including the base end portion having a convex spherical shape on the bottom portion, a resonance frequency is difficult to change and stability of a performance of the dynamic damper is high.

BRIEF DESCRIPTION OF DRAWINGS

FIG. 1 is a view showing a configuration of a steering wheel according to art embodiment, in which section (a) of FIG. 1 is a front view when viewed from the rear of the vehicle, and section (b) of FIG. 1 is a side view when viewed from a vehicle width direction.

FIG. 2 is an exploded perspective view showing constituent members of the steering wheel according to the embodiment.

FIG. 3 is an exploded perspective view showing constituent members of the steering wheel according to the embodiment.

Section (a) of FIG. 4 is a perspective view showing a fixing plate of an airbag device, section (h) of FIG. 4 is a perspective view showing a guide member of an attaching structure, and section (c) of FIG. 4 is a perspective view showing a lock spring of the attaching structure.

FIG. 5 is a view showing a connection state between the fixing plate of the airbag device and a main body part of the steering wheel, in which section (a) of FIG. 5 is an overall perspective view, section (b) of FIG. 5 is an enlarged front view when viewed from a vehicle rear side, and section (c) of FIG. 5 is an enlarged perspective view showing a positional relationship between an insertion pin used for connection and the main body part of the steering wheel.

FIG. 6 is an enlarged perspective view showing a state in which the attaching structure is attached to the fixing plate of the airbag device.

FIG. 7 is a perspective view showing an insertion pin used to attach the fixing plate of the airbag device to the main body part of the steering wheel.

FIG. 8 is an exploded perspective view of the insertion pin of FIG. 7.

FIG. 9 Section (a) of FIG. 9 is a perspective view showing a hook according to the embodiment, and section (b) of FIG. 9 is an enlarged perspective view showing a periphery of a base end portion of the hook according to the embodiment in an enlarged manner.

FIG. 10 is a sectional view showing a state in which the attaching structure is attached to the fixing plate of the airbag device.

Section (a) of FIG. 11 is a perspective view showing a hook according to a modification, and section (b) of FIG. 11 is an enlarged perspective view showing a periphery of a base end portion of the hook according to the modification.

DESCRIPTION OF EMBODIMENTS

Hereinafter, a steering wheel according to an embodiment of the present invention will be described with reference to the drawings.

FIG. 1 is a view showing a configuration of a steering wheel according to an embodiment, in which section (a) of FIG. 1 is a front view when viewed from the rear of the vehicle, and section (b) of FIG. 1 is a side view when viewed from a vehicle width direction. FIGS. 2 and 3 are exploded perspective views showing constituent members of the steering wheel according to the embodiment. Section (a) of FIG. 4 is a perspective view showing a fixing plate of an airbag device, section (b) of FIG. 4 is a perspective view showing a guide member of an attaching structure, and section (c) of FIG. 4 is a perspective view showing a lock spring of the attaching structure. FIG. 5 is a view showing a connection state between the fixing plate of the airbag device and a main body part of the steering wheel, in which section (a) of FIG. 5 is an overall perspective view, section (b) of FIG. 5 is an enlarged front view when viewed from a vehicle rear side, and section (c) of FIG. 5 is an enlarged perspective view showing a positional relationship between an insertion pin used for connection and the main body part of the steering wheel. FIG. 6 is an enlarged perspective view showing a state in which the attaching structure is attached to the fixing plate of the airbag device. Incidentally, in the drawings the vehicle rear side (an occupant side) is indicated by a reference sign "R", and a vehicle front side is indicated by a reference sign "F", appropriately.

A steering wheel 100 is rotatably attached to a vehicle rear end part of a steering shaft 200. An engine vibration and a vibration from a road surface are transmitted to the steering wheel 100 via the steering shaft 200. A maw body part 110 constituting a frame of the steering wheel 100 includes a hub 111 coupled to the steering shaft 200, an annular rim 112 surrounding the hub 111, and spokes 113 connecting the hub 111 and the rim 112. An airbag device 20 is attached to a center of the main body part 110 of the steering wheel on the vehicle rear side. In addition, a garnish 130 is attached to a vehicle rear side of the main body part 110, and a lower cover 50 is attached to a vehicle front side of the main both part 110.

The airbag device 20 houses, inside a cover 21 that is an outer covering, of the airbag device 20, a folded bag-shaped airbag (not shown) and an inflator (gas generation device) 27 for inflating and deploying the airbag when a vehicle collision. As shown in FIG. 3, the inflator 27 is connected to a sandwich plate 23 with a fixing plate 25 sandwiched therebetween. That is, protruding screws 23a of the sandwich plate 23 pass through openings of flange portions 27a which are provided at an outer rim of the inflator 27, and the protruding screws 23a are tightened with nuts 28.

The fixing plate 25 of the airbag device 20 is attached to the main body part 110 (hub 111) of the steering wheel 100 with three attaching structures 50, Each attaching structure 50 has a snap-fit structure, so that the airbag device 20 can be easily assembled to the steering wheel 100. Each snap-fit structure includes a tubular guide member 51 including a flange portion 52 at one end and a lock spring 53 as a holding side member, and includes an insertion pin 60 including a hook 70 (which will be described in detail in a later paragraph using FIG. 7, for example) as an insertion side member. The hook 70 of the insertion pin 60 is coupled to the holding side member through an opening 111a of the main body part 110. The guide member 51 passes through the fixing plate 25. A flange portion 52 of the guide member 51 abuts against a surface of the fixing plate 25 facing main body part 110 (vehicle front side). The guide member 51 has an opening through which the lock spring 53 is passed on the vehicle rear side of the fixing plate 25. The lock spring 53 is a member having an opening and closing structure that exerts a force to restore from an open state to a closed state, and is in an open state by a force applied when the insertion pin 60 is inserted from the main body part 110 side (vehicle front side) of the fixing plate 25. The lock spring 53 is fixed at a position crossing an opening 25a of the fixing plate 25. Specifically, the lock spring 53 is disposed to be parallel to the fixing plate 25 and to cross the guide member 51 through the opening of the guide member 51. The insertion pin 60 is inserted into the tubular guide member 51 from the main body part 110 side (vehicle from side) of the fixing plate 25, and a tip end portion 75 of the hook 70 (which will be described in detail in the later paragraph using FIG. 7, for example) is disposed inside the guide member 51. As a result, the tip end portion 75 of the hook 70 passes through the opening 25a of the fixing plate 25, and is locked to the lock spring 53 at a position where the tip end portion 75 is beyond the lock spring 53. As a result, the fixing plate 25 of the airbag device 20 is connected to the main body part 110 of the steering wheel 100 using the snap-fit structure.

FIG. 7 is a perspective view showing an insertion pin used to attach the fixing plate of the airbag device to the main body part of the steering wheel. FIG. 8 is an exploded perspective view of the insertion pin of FIG. 7. Section (a) of FIG. 9 is a perspective view showing the hook according to the embodiment, and section (b) of FIG. 9 is an enlarged perspective view showing a periphery of a base end portion of the hook according to the embodiment in an enlarged manner. The insertion pin 60 is (brined b combining a spiral return spring 61, an annular elastic member 63, a hook 70, and a hollow holding member 67 opened upward.

The return spring 61 is a coil spring and is disposed to surround the hook 70. One end of the return spring 61 abuts against the holding member 67 fixed to the main body part 110 of the steering wheel 100, and the other end of the return wring 61 abuts against the flange portion 52 of the guide member 51. The holding member 67 and the guide member 51 are disposed to face each other, and are urged by the return spring 61 in a direction in which the holding member 67 and the guide member 51 are separated from each other. That is, the return spring 61 abuts against the holding member 67 and the guide member 51 (flange portion 52) such that the fixing plate 25 of the airbag device 20 is separated from the steering wheel 100. When the tip end portion 75 of the hook 70 is locked to the lock spring 53 inside the tubular guide member 51, a positional relationship between the fixing plate 25 of the airbag device 20 and the steering wheel 100 is maintained.

The hook 70 has a structure in which a substantially rod-shaped protruding part 73 protrudes from one side of a substantially disc-shaped base end portion 71. A hook-shaped tip end portion 75 is provided at a tip end of the protruding part 73. The tip end portion 75 is used for locking to the lock spring 53. In addition, an annular protrusion (rib) 78 is provided on an outer periphery of the protruding part 73 near the base end portion 71. A fitting protrusion 72 and linear protrusions (rib) 77 which are shorter than the protruding part 73 are provided on the protruding part 73 side of the base end portion 71.

In an assembled suite of the insertion pin 60, the protruding part 73 of the hook 70 passes through the return spring 61 and a cavity 64 at a center of the elastic member 63. The fining protrusion 72 of the hook 70 fits into an opening 65 provided in the elastic member 63, and is used for positioning the hook 70 and the elastic member 63. The elastic member 63 attached to the hook 70 abuts against the linear protrusion 77 and the annular protrusion 78, and a slight gap is provided between the elastic member 63 and a main body of the protruding part 73. In addition, the holding member 67 is attached to the hook 70 to which the elastic member 63 is mounted so as to cover a lateral part and a lower part of the base end portion 71. The holding member 67 is formed by coupling, a pair of holding member components 67a, 67b each having the same shape (two-fold symmetry) when rotated by 180°.

FIG. 10 is a sectional view showing a state in which the attaching structure is attached to the fixing plate of the airbag device. An arrow in the figure indicates a direction in which an urging force of the return spring 61 is applied. As shown in the figure, the hook 70 has a structure in which a surface of a core member 70b made of metal is covered with a surface layer material 70a made of plastic. That is, the hook 70 can be formed, in a state where the core member 70b made of metal such as iron is fixed inside a mold, by injecting a resin into the mold and curing the injected resin. With such a structure, it is possible to ensure accuracy required for processing a shape of the tip end portion 75 to be locked to the lock spring 53, shapes of the linear protrusion 77 and the annular protrusion 78 to be abutted against the elastic member 63, for example.

As described above, the guide member 51 and the lock spring 53 which are the holding side member of the attaching structure 50 are attached to the fixing plate 25 of the airbag device 20. The tip end portion 75 of the hook 70 that enters from the vehicle front side is beyond the lock spring 53, and is locked to the lock spring 53, so that the hook 70 is connected to the fixing plate 25.

The base end portion 71 of the hook 70 is held by the holding member 67 in a state in which a movement of the hook 70 in a protruding direction is restricted since the return spring 61 is urged in a separating direction. Since the holding member 67 holding the base end portion 71 is fixed by fitting with the main body part 110 (hub 111) of the steering wheel 100, the hook 70 is also connected to the steering wheel 100. Therefore, the fixing plate 25 of the airbag device 20 is connected to the steering wheel 100 via the hook 70. Further, since the hook 70 is swingably held, the airbag device 20 can be made to function as a dynamic damper.

With the above configuration, in a normal state, the airbag device 20 is lifted by the return spring 61. In addition, when the airbag device 20 is operated, the airbag device 20 is pulled toward the vehicle rear side (occupant side) by a force of inflation and deployment of the airbag. At this time, the lock spring 53 and the hook 70 are locked to each other, so that the airbag device 20 is prevented from falling off.

The base end portion 71 of the hook 70 has a bottom surface 71a having a convex spherical shape. Here, the "convex spherical shape" is intended to prevent swing (pivoting) of the hook 70 from being hindered by the holding member 67, and the bottom surface shape of the base end portion 71 of the hook 70 is not limited to a strict spherical surface as long as such an effect is obtained.

The bottom surface 71a of the base end portion 71 of the hook 70 may abut against the holding member 67, but it is preferable that a space S is provided between the bottom surface 71a of the base end portion 71 of the hook 70 and the holding member 67. By using such a structure, a movable range of the hook 70 when the hook 70 swings can be increased. In addition, in a case where the hook 70 swings in the normal state in which the airbag device 20 is not operated, it is preferable that the bottom surface 71a of the base end portion 71 of the hook 70 and the holding member 67 do not abut against each other. Here, a term "the bottom surface 71a and the holding member 67 do not abut against each other" does not mean that the bottom surface 71a and the holding member 67 do not abut against each other at all, but is a concept that allows the bottom surface 71a and the holding member 67 to abut against each other, for example, when the hook 70 swings greatly.

It is preferable that horn contacts are provided on the fixing plate 25 of the airbag device 20 and the main body part 110 of the steering wheel 100, and the hoar contacts are brought into contact with each other by an occupant pressing the airbag device 20, so that the born sounds. From a viewpoint of smoothly assembling the hook 70, it is preferable that a size of the space S is smaller than an interval between the horn contacts.

The hook 70 partially abuts against the elastic member 63 by the fitting protrusion 72, the linear protrusion 77, and the annular protrusion 78. Therefore, vibration damping can be promoted by causing, the elastic member 63 to absorb energy of the swing of the hook 70. Since the elastic member 63 is provided with the opening 65, deformation of the opening 65 can be used to distort the elastic member 63.

In the present embodiment, when the vibration is transmitted to the steering wheel 100, the transmitted vibration is also transmitted to the tip end portion 75 of the hook 70 locked to the lock spring 53 via the base end portion 71 of the hook 70 abutting against the main body part 111 of the steering wheel 100, The return spring 61 is urged at the lock portion such that the tip end portion 75 of the hook 70 and the lock spring 53 strongly interfere with each other, so that the hook 70 swings around the base end portion 71 having the convex spherical shape. When the hook 70 itself swings, the fixing plate 25 of the airbag device 20 swings via the lock spring 53 and the guide member 51, and thus, the airbag device 20 acts as a dynamic damper. At this time, the hook 70 is less likely to deteriorate since the hook 70 abuts against a member having rigidity such as the steering wheel 110 and swings, and the swing of the hook 70, that is, an amplitude (frequency) of the airbag device 25 can be prevented from changing over time.

In the structure described in Patent Literature 1, when the vibration transmitted to the steering wheel is damped, the airbag device swings around the elastic member. Therefore, tuning, of a resonance frequency is tuned by a hardness of the elastic member. In addition, since not only a load is applied to the elastic member serving as a fulcrum of the swing during the vibration damping, but also a load is applied to the elastic member during use of the horn, deterioration such as deformation or change in quality of the elastic member is likely to occur due to the load. As a result, since the amplitude of the airbag device changes before and after the deterioration of the elastic member, the resonance frequency to be damped may change, and a vibration damping performance of the dynamic damper may deteriorate. On the other hand, in the present embodiment, since the fulcrum of the swing is determined by the shape of the base end portion 71 of the hook 70, the resonance frequency is difficult to change, and a performance of the dynamic damper is stabilized. In addition, in the present embodiment, a function of the horn can be designed such that the horn contacts provided on the fixing plate 25 of the airbag device 20 and the main body part 110 of the steering wheel 100 come into contact with each other when the return spring 61 is compressed. Therefore, the function of the horn can be ensured while preventing deterioration of the vibration damping performance of the dynamic damper.

In the present embodiment, on the vehicle rear side, the elastic member 63 is provided between the holding member 67 and the base end portion 71 of the hook 70, and the base end portion 71 abuts against the elastic member 63, so that generation of abnormal noise due to the swinging hook 70 abutting against the holding member 67 can be prevented. In addition, unlike the structure described in Patent Literature 1, the hardness of the elastic member 63 can be adjusted according to a distance between the elastic member 63 and the fulcrum of the swing of the hook 70. In general, the elastic member 63 is made soft in a case where the distance to the fulcrum is short, and is made hard in a case where the distance to the fulcrum is long.

In the present embodiment, the base end portion 71 of the hook 70 abuts against the elastic member 63 with line contact by the linear protrusion 77 and the annular protrusion 78, for example, so that it is difficult to suppress the swing of the hook 70. From the viewpoint of preventing the swing of the hook 70 from being suppressed, a contact protrusion may be provided on at least one of the base end, portion 71 and the elastic member 63, and is preferably provided on the base end portion 71 side formed of the plastic surface layer material 70a that is less likely to deteriorate than the elastic member 63.

Although the embodiment of the present invention has been described above, the present invention is not limited to the contents described in the above embodiment. The configuration described in the embodiment may be appropriately deleted, added, changed, or combined without departing from the scope of the present invention.

Modification

The configuration of the attaching, structure is not limited to that shown in FIG. 10. Section (a) of FIG. 11 is a perspective view showing a hook according to a modification, and section (b) of FIG. 11 is an enlarged perspective view showing a periphery of a base end portion of the hook according to the modification. A hook 80 according to the modification has dot-shaped protrusions (emboss) 83 on the base end portion 71 instead of the line protrusions (rib) 77 shown in FIG. 9, and dot-shaped protrusions (emboss) 84 on an outer periphery of the protruding part 73 instead of the annular protrusion (rib) 78 shown in FIG. 9. An attaching structure of the modification including such an embossed type hook 80 can abut against the elastic member 63 with point contact, and the same effect as the attaching structure of the embodiment including the rib type hook 70 can be obtained.

Although the one end of the return spring 61 abuts against the holding member 67 fixed to the main body part 110 of the steering wheel 100 in FIG. 10, the one end of the return spring 61 may abut against the main body part 110 of the steering wheel 100.

Although the bottom surface 71a of the base end portion 71 having the convex spherical shape of the hook 70 faces the bottom surface of the holding member 67 in FIG. 10, the holding member 67 may have a tubular shape without a bottom surface as long as the holding member 67 is hollow so as to hold the hook 70. In a case where the holding member 67 does not have the bottom surface and the main body pan 110 has a concave member covering the holding member 67, the bottom surface 71a having the convex spherical shape of the base end portion 71 may face the concave member of the main body part 110 of the steering wheel 100.

The fixing plate 25 of the airbag device 20 is generally made of metal, but in a case of being made of resin, the fixing plate 25 and the wide member 51 of the attaching structure 50 can be integrally formed.

The present application is based on a Japanese Patent Application No. 2018-051059 filed on Mar. 19, 2018, the contents of which are incorporated herein by reference.

REFERENCE SIGNS LIST 20 airbag device
21 cover
23 sandwich plate
23a protruding screw
25 fixing plate
25a opening
27 inflator
27a flange portion
28 nut
50 attaching structure
51 guide member
52 flange portion
53 lock spring
60 insertion pin
61 return spring
63 elastic member
64 cavity
65 opening
67 holding member
67a, 67b holding member component
70, 80 hook
70a surface layer material
70b hub
71 base end portion
71a bottom surface
72 fitting protrusion
73 protruding part
75 tip end portion
77 linear protrusion
78 annular protrusion
83, 84 dot-shaped protrusion
100 steering wheel
110 main body part
111 core metal
111a opening
112 rim
113 spoke 130 garnish
150 lower cover
200 steering shaft
S space

The invention claimed is:

1. A steering wheel comprising:
a main body part to which a fixing plate of an airbag device is attached by a plurality of attaching structures, each attaching structure including:
   a tubular guide member passing through an opening of the fixing plate, the guide member including a flange portion facing the main body part;
   a lock spring fixed at a position crossing the opening;
   a hook passing through the opening, the hook having: a tip end portion locked to the lock spring at a position where the tip end portion is beyond the lock spring; and a base end portion provided at an end portion opposite the tip end portion;
   a hollow holding member fixed to the main body part and disposed to face the guide member, the holding member holding the base end portion of the hook while restricting the base end portion from moving toward a side of the tip end portion; and
   a return spring disposed to surround the hook, one end of the return spring abutting against the main body part of the steering wheel or the holding member, the other end of the return spring abutting against the flange portion of the guide member, the return spring urging the main body part or the holding member and the flange portion in a separating direction,
wherein the base end portion has a bottom portion being a convex spherical shape.

2. The steering wheel according to claim 1,
wherein an elastic member is provided between the holding member and the base end portion of the hook, and the base end portion abuts against the elastic member.

3. The steering wheel according to claim 2,
wherein the base end portion of the hook and the elastic member abut against each other with a plurality of protrusions provided on at least one of the base end portion and the elastic member.

* * * * *